United States Patent [19]

Finders, Jr.

[11] Patent Number: 4,781,325
[45] Date of Patent: Nov. 1, 1988

[54] THERMOSTATIC VALVE WITH TRAP REPAIR CARTRIDGE

[75] Inventor: Gordon W. Finders, Jr., Marshalltown, Iowa

[73] Assignee: Dunhyam-Bush, Inc., West Hartford, Conn.

[21] Appl. No.: 142,597

[22] Filed: Jan. 11, 1988

[51] Int. Cl.$^4$ .......................... F16T 1/02; F16K 25/00
[52] U.S. Cl. .................................. 236/58; 236/99 R; 137/454.5; 137/329.01; 251/367
[58] Field of Search .......................... 236/58, 56, 59, 60, 236/64, 66, 42, 43, 99 J, 93 R, 93 A, 99 R, 101 R; 137/454.2, 454.5, 315, 329.01; 251/367, 361, 357, 360, 357, 366, 84, 88

[56] References Cited

U.S. PATENT DOCUMENTS

| | | | |
|---|---|---|---|
| 942,045 | 12/1909 | Ashley | 137/329.01 |
| 1,797,258 | 3/1931 | Crosthwait, Jr. et al. | 236/58 |
| 1,911,230 | 5/1933 | Jones | 236/58 |
| 2,628,783 | 2/1953 | Fernald | 236/58 |

*Primary Examiner*—Harry B. Tanner
*Attorney, Agent, or Firm*—Sughrue, Mion, Zinn, Macpeak & Seas

[57] ABSTRACT

A thermostatic valve such as a steam trap, incorporates a cup shaped trap repair cartridge having the lower end of an annular intermediate valve body of cast metal threaded into an upwardly open, internally threaded cup shaped valve casing. The trap repair cartridge in turn receives the external threads of an inverted cup shaped cover of cast metal whose lower annular wall has threads on its outer periphery matching the internal threads of the annular intermediate valve body. The trap repair cartridge includes a conical bottom wall terminating in a flat, central horizontal bottom wall portion which is provided with an axial hole defining a valve seat. A hollow sheet metal thermostatic actuator is provided with an axial projection on one surface which projection is threaded about its outer periphery and which projection is threaded into a mating tapped hole within the bottom of an adaptor post. The adaptor post has a reduced diameter upper end threaded into a mating tapped axial hole within a downwardly extending axial cylindrical projection at the center of the cover, which cover is threaded onto the open upper end of the trap repair cartridge. The actuator includes a valve disc closure on its opposite face overlying the valve seat defined by the horizontal wall portion of the annular intermediate valve body. The adaptor post and the annular intermediate valve body are of like axial length such that the actuator is properly positioned relative to the valve seat.

5 Claims, 1 Drawing Sheet

THERMOSTATIC VALVE WITH TRAP REPAIR CARTRIDGE

FIELD OF THE INVENTION

This invention relates to thermostatic valves adapted to automatically regulate the flow of fluid subjected to temperature and/or pressure variations such as outlet valves for steam radiators and more particularly, to such valves which incorporate a replaceable valve actuator assembly for effecting repair due to deterioration of the interior valve structure as a result of use and controlling steam flow over an extensive period of operation.

BACKGROUND OF THE INVENTION

Such thermostatic valve includes internally, a valve actuator responsive to the pressure and/or temperature consisting of one or more expansible metallic cells, bellows or the like with the actuator supporting for movement a valve closure movable towards and away from a valve seat within a valve outer body or casing defining the outlet port of the valve.

The assembled valve structure including the outer body or casing carrying the valve seat is customarily installed as a permanent part of the heating system. While some parts may last indefinitely, the actuator, the valve disc and the seat are subject to deterioration so that replacement or repair of one or more of these parts at intervals is normally necessary. Typically, the outer body or casing is closed off at the top by a threaded cover permitting access to the valve body interior so that the actuating element may be removed from the valve casing for repair or replacement. One of the problems in replacing or repairing the actuating element is to provide or effect accurate adjustment of the reassembled parts or to permit substitution or replacement of parts which have deteriorated or which have been destroyed so that the replacement parts or repair parts can operate under the same temperature and pressure parameters, as those initially installed.

U.S. Pat. No. 1,911,230 issued May 30, 1933 is directed to a thermostatic valve of that type in which the parts of the valve, commonly subject to rapid wear or deterioration, constitute a unitary assembly which may be accurately calibrated by empirical methods, is capable of installation in conventional steam trap casings by dropping it freely into the valve body or casing after removal of the cover where, the assembled unit is held in proper position.

While such internal assembly has permitted the thermostatic valve to operate satisfactory, when unit parts replace those are worn or inoperative and while the unit parts permit precalibration prior to assembly, the replacement unit as evidence by U.S. Pat. No. 1,911,230, is characterized by a hollow cylindrical cage formed totally or principally of sheet metal components and utilizes a coil spring compressed between the threaded cover and the cage for maintaining the unit in position. Such arrangement often fails to maintain the desired relationship, or fails to insure a seal between the replacement part and the valve casing and cover and the unit components are relatively complex and therefore costly.

It is a primary object of the present invention, therefore, to provide an improved thermostatic valve employing a trap repair cartridge which is has an annular intermediate valve body of cast metal, is threaded at one end to the valve casing and at the opposite end to the cover, which is of simplified construction, which in turn threadably supports the valve trap disc, coaxially of the valve seat, which employs a simple adaptor post to maintain proper positioning between the valve trap disc and the cover, which permits reuse of the cover, and which constitutes a simple and low cost assembly.

DESCRIPTION OF THE PREFERRED EMBODIMENT

Figure 1:
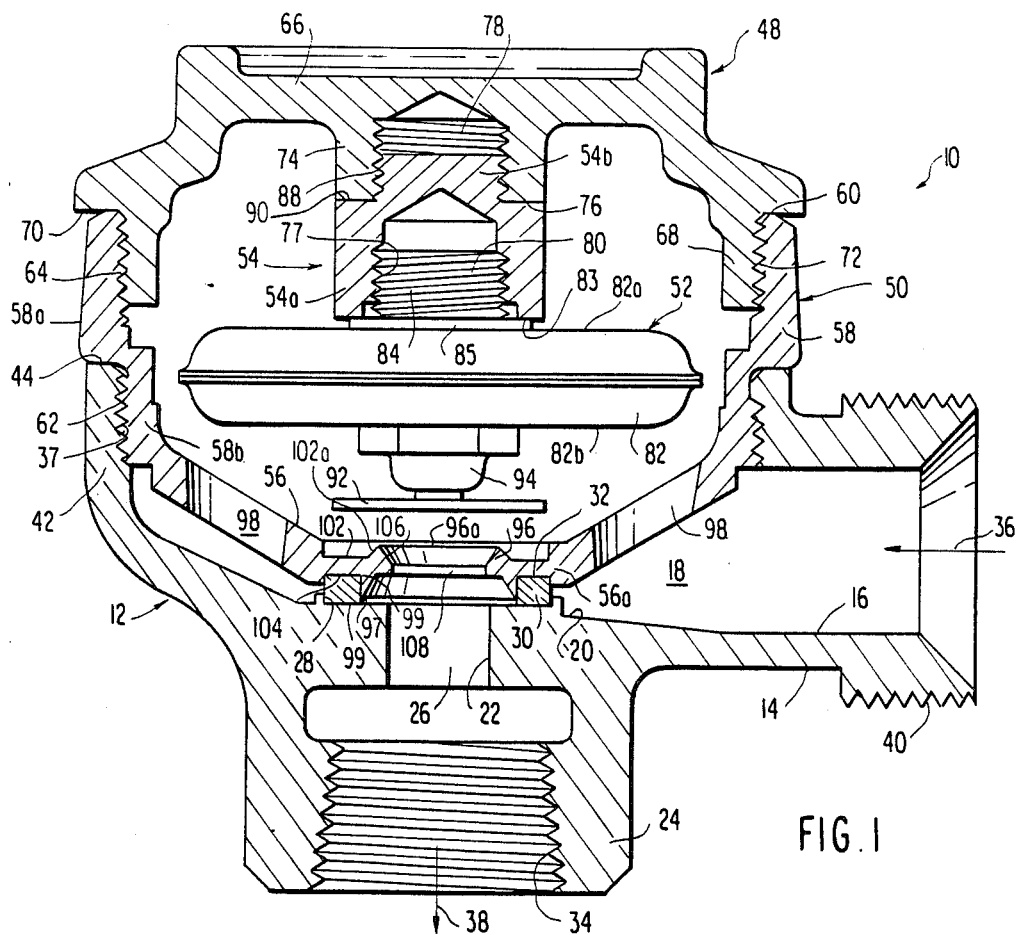
FIG. 1 is a vertical sectional view of a thermostatic valve including a trap repair cartridge and forming a preferred embodiment of the invention.
Figure 2:
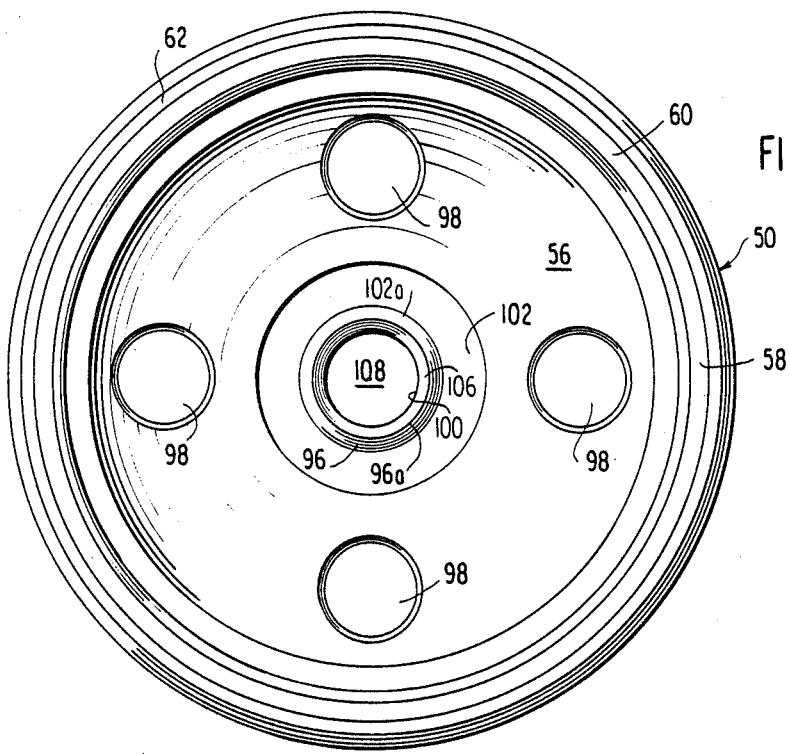
FIG. 2 is a top plan vie of the repair cartridge forming a main element of the thermostatic valve of FIG. 1.
Figure 3:
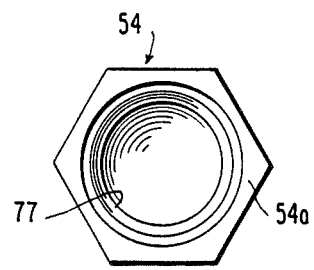
FIG. 3 is a bottom plan view of the adaptor post employed in the thermostatic valve of FIG. 1.

Referring to the drawings, and particularly to FIG. 1, there is illustrated a preferred embodiment of a thermostatic outlet valve employable for automatically controlling the flow of steam through a radiator (not shown). The thermostatic valve indicated generally at 10, includes a upwardly open, cup shaped valve casing or body indicated generally at 12 provided at one side with a horizontally projecting, cylindrical, threaded nipple 14 having a bore defining an inlet passage 16 leading to an interior valve chamber 18. The cup shaped valve casing 12 is formed so as to have a bottom wall 20, is provided with a vertical bore 22 which connects chamber 18 to the interior of an integral lower socket member 24. Bore 22 defines a outlet passage 26 for the valve and, the bottom wall 20 is provided with an annular recess 28 of rectangular cross section, within which recess 28 seats an annular metal ring 30 defining a valve seat 32. The socket member 24 is internally threaded at 34 and may be threaded to an outlet pipe (not shown) of the radiator. Steam emanating from the radiator therefore enters bore 16 as indicated by the arrow 36, and leaves the valve casing through the outlet passage 26 as indicated by arrow 38. Nipple 14 may be connected to the radiator (not shown) by means of its external thread 40. The cup shaped casing 12 includes an annular side wall 42 terminating in a flat upper edge 44 and the valve casing 12 is threaded along the interior of side wall 42 as at 37. The valve casing 12 is conventional, it may be typically a commercial valve casing such as that shown in U.S. Pat. No. 1,911,230 assigned to Barnes & Jones of Newtonville, Mass.

Further, the thermostatic valve 10 of the present invention further includes a cylindrical cap or cover indicated generally at 48 which cap is conventional, and may be the same cap normally carried by the valve casing 12 by being threaded thereto prior to the addition of repair cartridge indicated generally at 50 and the steam trap disc indicated generally at 52 which are respectively, third and fourth components of valve 10 and complete that structure.

Importantly, the repair cartridge 50 as well as the cap 48 are preferably formed of cast metal and in the improved thermostatic valve 10 of the present invention, the repair cartridge functions as an intermediate annular casing threadably coupled respectively, at opposite ends, to the valve casing 12 and the cast metal cap or cover 48. A fifth component 54 is a cylindrical metal adaptor post which may be machined from a piece of cast iron, steel or the like and which has one end threaded coaxially to cap 48 and the other end threaded to the steam trap disc 52.

The repair cartridge 50, similar to valve casing 12 and cap 48, may be formed of cast brass, and is of upwardly open cup shaped form including a somewhat conical bottom wall 56. An annular side wall 58 thereof terminates in a flat upper edge 60. Side wall 58 consists of a relatively large diameter portion 58a whose outer diameter is generally equal to the outer diameter of side wall 42 of valve casing 12, and a reduced diameter portion 58b, offset from portion 58a, whose outer side wall is threaded at 62, being of a diameter matching the inner diameter of the valve casing side wall 46 and being threaded thereto via threads 46 of the cup shaped valve casing 12. The larger diameter side wall portion 58a of the repair cartridge is provided with threads 64 on its inner periphery and has an internal diameter on the order of that of valve casing side wall 42, so as to permit threaded engagement between cap 48 and the radially enlarged portion 58a of the repair cartridge side wall 58.

The cap or cover 48 is of inverted cup shaped form including a base or top wall 66, and an annular side wall 68 which is recessed at 70, within the outer periphery thereof, and whose outer periphery is threaded at 72 to match the threads 64 on the repair cartridge large diameter portion annular side wall 58. The inverted cup shaped cover or cap 48 has, projecting axially from the base, a cylindrical projection 74 of relatively short length, terminating in a flat annular, axially outer edge 76 and provided with a tapped axial hole 78. Due to the presence of the repair cartridge 50, there is a need for maintenance of threaded engagement between an exteriorly threaded stud 80 integral with the axially expandable thin metal cell 82 and cap or cover 48. Stud 80 is threaded at 84 on its outer periphery and is of a diameter corresponding to that of tapped hole 78 within cylindrical projection 74 of cap 48. Stud 80 in the invention is threaded into an identically sized tapped hole 77 within adaptor post 54. The adaptor post 54 is of T-shaped cross sectional configuration including a radially enlarged base portion 54a and an axially projecting, smaller diameter post portion 54b carrying threads 88 on its outer periphery, such that post portion 54b is threaded into the tapped hole 76. The adaptor post 54 has a flat annular face 90 which abuts the flat end face 76 of the axial projection 74 of cap 48. The adaptor post 54 has a flat end face 83 which abuts ring 85 fixed to the upper face 82a of cell 82. On the opposite side of the metallic cell 82, a thin metal valve disc 92 is mounted by way of ball and socket member 94 to the lower face 82b of the metallic cell 82 to coaxially maintain valve disc 92 in a position centered on an annular valve seat 96 formed within conical bottom wall of the repair cartridge 50.

The conical bottom wall 56 of the repair cartridge is provided with a plurality of circumferentially spaced, circular apertures or holes 98, in the illustrated embodiment four in number at 90° to each other and spaced about a center hole 100 within said member, defined by a valve seat of conical near cross section to effect line contact between edge 96a of the integral valve seat 96 within the cast bronze cup shaped repair cartridge 50. The conical bottom wall 56 of the repair cartridge terminates at its lower end, in a horizontal wall portion 56a within which is provided upper and lower coaxial annular grooves 102 and 104, the lower groove 104 being of rectangular configuration and being sized so as to receive sealably annular gasket 28 abutting the valve seat for the valve casing 12 prior to modification by replacement parts 50, 52 and 54. The horizontal wall portion 56a terminates adjacent the outlet in a conical cross section, annular projection 97 which mates with the old seat 99 and being sized to effect contact between the old seat 99 and the annular projection 97 with some deformation to insure a metal to metal seal and thereby provide a positive pressure seal between the lower edge of the repair cartridge and the bottom wall 20 of the valve casing 12. Within the lower, coaxial annular groove 104, resides the protective annular pad 28 which can also act as a gasket if the metal to metal seal is not achieved due to extreme wear at the valve seat of the thermostatic trap prior to repair or reconstruction using the repair cartridge and the associated elements. The upper annular groove 102, within the repair cartridge bottom wall portion 56a, is not of rectangular cross section, the radial inner wall 102a of said annular groove 102, is oblique, radially upwardly and inwardly and intersects, an oppositely oblique annular wall 106 defining an axial outlet flow port 108 within that member.

It is apparent from the above description that the subject repair cartridge, a replacement steam trap thermostatic disc and the adaptor opposed permit ready removal of the internal elements of a steam trap without the necessity of removing the body of the steam trap from its connective plumbing, in which the steam trap valve casing proper cover retain their original function, the repair cartridge is formed principally of an annular casing section which axially extends the assembly while sealing upper and lower ends to the retained primary valve casing and cover, while the adaptor opposed, being sized to the axial dimensions of the intermediate valve casing insures upon being fully threaded to the cap at one end and having the thin metal cell axial projection fully threaded into the opposite end, insured proper position of the thin metal cell and its accompanying valve disc relative to the valve seat. Further, since the repair cartridge incorporates a new valve seat provided with a conical cross sectional bottom wall of the repair cartridge, and the conical cross section annular projection on the outlet side mates with the old, incurs metal to metal mating with the old seat under deformation. A positive pressure seal is effected therebetween. If needed or desired, an annular upper groove within the repair cartridge bottom wall adjacent the outlet orifice defined thereby, may carry an annular protective pad capable of functioning as a gasket if metal to metal seal is not achieved circumferentially about this annular projection.

While the invention has been described with respect to a preferred embodiment, it should be understood that the illustrated embodiment is merely by way of example and that the invention is not limited thereto, but the substitution of parts and materials, rearrangement of the same and employment of equivalence may be made without the parting from the spirit of the invention.

What is claimed is:

1. In a thermostatic valve comprising an upwardly open cup shaped valve casing having a horizontal bottom wall and an integral, annular side wall, an inlet passage within said annular side wall leading to an interior valve chamber defining a radial inlet passage, an axial hole within the bottom wall defining a fluid outlet passage, an inverted cup shaped cover adapted to threadably engage said valve casing annular wall to close off said valve chamber, a hollow sheet metal thermostatic actuator having a cylindrical axial projection fixed to one face and threadably engaging said cover and having a valve closure disc mounted to the other face of said thermostatic actuator for closing off said axial hole, the improvement comprising: a trap repair cartridge having an intermediate annular valve casing threaded at one axial end to said cover and being threaded at its opposite end to said valve casing annular wall, thereby axially enlarging said valve chamber, said trap repair cartridge further including a downwardly and radially inwardly conical bottom wall terminating in a integral, flat horizontal wall portion having an axial hole therein opening to said outlet passage and having a plurality of openings through said conical wall communicating the inlet passage within said valve casing to the interior of said trap repair cartridge, and said thermostatic valve further comprising an adaptor post having an axial bore within one end thereof and a small diameter axial projection at said other end and being of a axial length equal to the axial length of said intermediate annular valve casing and wherein the periphery of said axial projection of said adaptor post has threads thereon such that, with the reduced diameter portion of said adaptor post threaded into the tapped axial hole within the bottom of said inverted cup shaped cover and said cylindrical projection of said hollow sheet metal thermostatic actuator threaded into the tapped axial hole within the bottom of adaptor post, said thermostatic actuator is positioned such that the valve closure disc mounted thereto faces a valve seat defined by the axial hole within the horizontal portion of the bottom wall of said trap repair cartridge thereby forming, a low cost, thermostatic valve assembly which retains the original orifice size while raising the valve seat height by a minimum amount but retaining the identical moving parts of the original thermostatic valve.

2. The thermostatic valve as claimed in claim 1, wherein said adaptor post includes an annular face radially outside of the exteriorly threaded axial projection on the end facing the cover which seats on a flat end face of the axial projection of said cover and the axial end face of said adaptor post proximate to said hollow sheet metal thermostatic actuator is flat and abuts a surface of the thermostatic actuator which is perpendicular to the axis of the valve assembly to facilitate equal depth threading of said axial projection on said thermostatic actuator into the axial hole of said adaptor post to the same extent that the axial reduced diameter projection of the post is threaded into the tapped axial hole within the bottom of the inverted cup shaped cover.

3. The thermostatic valve as claimed in claim 1, wherein said flat bottom wall of said trap repair cartridge includes annular recesses on opposite sides thereof, and wherein, radially inward of said recesses said bottom wall is provided with a pair of axial projections of annular form having obliquely tapered faces defining annular projections of conical cross section and wherein the conical cross section annular projection facing said valve casing effects metal to metal mating with the bottom of said valve casing when said repair cartridge is threaded into the upwardly open cup shaped annular valve casing.

4. The thermostatic valve as claimed in claim 3, wherein a protective pad of annular form, is sized to and interposed within the annular groove of said repair cartridge bottom wall facing said valve casing, whereby said protective pad functions as a gasket between said trap repair cartridge and said valve casing in the vicinity of said outlet passage at said valve casing outlet passage.

5. The thermostatic valve as claimed in claim 1, wherein said upwardly open, cup shaped valve casing includes internal threads on the inner surface of the annular wall thereof, said cover includes an annular wall having an outside diameter on the order of the inside diameter of the annular wall of said trap repair cartridge and carries exterior threads on the outer periphery thereof matching the threads on the inner surface of the trap repair cartridge annular wall, wherein the trap repair cartridge annular wall includes vertically upper and lower annular wall portions which are laterally offset with the portion of the annular wall proximate to the valve casing being of reduced diameter and having threads on the radially outer surface thereof threaded to the inner surface of the valve casing annular wall and said cover being threaded at the lower end thereof, by way of the exterior threads on outer periphery of the cover with the threads of the inner periphery of the trap repair cartridge upper annular wall portion.

* * * * *